United States Patent [19]
Yamagishi

[11] Patent Number: 5,894,332
[45] Date of Patent: Apr. 13, 1999

[54] SCANNING CIRCUIT STRUCTURE OF A TELEVISION RECEIVER

[75] Inventor: Nobuyoshi Yamagishi, Iwai, Japan

[73] Assignee: Victory Company of Japan, Ltd., Yokohama, Japan

[21] Appl. No.: 08/722,889

[22] Filed: Sep. 23, 1996

[30] Foreign Application Priority Data

Sep. 28, 1995 [JP] Japan ................................. 7-274694
Dec. 14, 1995 [JP] Japan ................................. 7-347291

[51] Int. Cl.$^6$ ............................... H04N 5/45; H04N 3/16
[52] U.S. Cl. ........................... 348/564; 348/553; 348/555; 348/588; 348/565
[58] Field of Search ........................ 348/564, 553, 348/555, 588, 706, 656, 565; H04N 3/16, 5/45, 5/445

[56] References Cited

U.S. PATENT DOCUMENTS

| | | | |
|---|---|---|---|
| 4,414,571 | 11/1983 | Kureha et al. | 348/555 |
| 4,724,487 | 2/1988 | Casey | 348/565 |
| 4,796,089 | 1/1989 | Imai et al. | 348/565 |
| 5,481,315 | 1/1996 | Matsunaga | 348/588 |
| 5,680,177 | 10/1997 | Abe | 348/565 |
| 5,715,013 | 2/1998 | Kang | 348/564 |
| 5,729,300 | 3/1998 | Ahn | 348/564 |

FOREIGN PATENT DOCUMENTS

| | | |
|---|---|---|
| 56-65572 | 6/1981 | Japan . |
| 61-225978 | 10/1986 | Japan . |
| 61-57750 | 12/1986 | Japan . |
| 6-14689 | 2/1994 | Japan . |

*Primary Examiner*—John K. Peng
*Assistant Examiner*—Jean W. Désir
*Attorney, Agent, or Firm*—Lowe Hauptman Gopstein Gilman & Berner

[57] ABSTRACT

A television receiver is disclosed which is designed to display two types of input picture signals, for example, an NTSC signal and a VGA signal on at least two display areas of one image screen simultaneously. The television receiver includes an auxiliary coil and a switching circuit. The auxiliary coil is operable in first and second operation modes. The first operation mode is such that an electron beam is scanned in sequence along the scanning lines to reproduce the VGA signal having a horizontal scanning frequency of substantially twice that of the NTSC input signal, while the second operation mode is such that the scanning line intervals are controlled so as to scan the electron beam two times along the same scanning line to reproduce the consecutive two of line signals of the frequency-converted NTSC signal which are formed by the same portion of the NTSC input signal. The switching circuit is responsive to an area signal indicative of the display area of at least one of the frequency-converted NTSC signal and the VGA signal to switch between the first and second operation modes of the auxiliary coil for displaying high-quality images on the different display areas of the image screen.

2 Claims, 6 Drawing Sheets

SCANNING CIRCUIT STRUCTURE OF A TELEVISION RECEIVER

BACKGROUND OF THE INVENTION

TECHNICAL FIELD

The present invention relates generally to a television receiver designed to double the number of scanning lines (i.e., a horizontal scanning frequency) of an input video signal and to scan the same line signal two times along the same scanning line, in sequence, for recreating a picture on a screen. More particularly, the invention relates to a television receiver designed to scan, in an improved scan format, a video signal whose horizontal scanning frequency converted to be twice that of an input video signal and the input video signal which is double-speed converted for displaying them on different areas of one image screen simultaneously.

BACKGROUND OF RELATED ART

It is established in current television standards, for example, NTSC standards, that the interlace scanning is carried out using 525 scanning lines to recreate 30 pictures per second. Thus, an increase in size of a screen causes intervals between the scanning lines of a reproduced picture to be broadened, so that the visibility of the scanning lines increases. To alleviate this problem of a subjective decrease in resolution, there has been proposed a so-called scanning line conversion system wherein pictures are recreated using the increased number of scanning lines with an increased horizontal scanning frequency. For example, conversion of NTSC signals in an interlacing system into picture signals in a non-interlacing system using twice the horizontal scanning frequency has been proposed. This conversion is achieved by reading out a signal of each line, which is written in sequence in a line memory, at twice the writing speed. Specifically, a video signal of each line is converted two times to produce a sequence of video signals to double the horizontal scanning frequency. In the following discussion, this will be referred to as double-speed conversion.

When the above described signals whose horizontal scanning frequency is doubled are reproduced by a television receiver operating at approximately twice a horizontal scanning frequency of the NTSC system, it will cause two consecutive scanning lines of electron beams to be formed by the same video signal, thereby resulting in a decrease in vertical resolution, leading to a reduction in quality of images. To avoid this problem, there has been proposed a horizontal deflection device which uses a switching element to change scanning intervals of an electron beam so that the electron beam traces the same scanning line two times with the same video signal.

For example, Japanese Patent First Publication No. 57-65066 teaches the changing of scanning intervals which is accomplished by superimposing a horizontal frequency signal on a convergence signal to operate a convergence coil. Additionally, Japanese Patent Second Publication No. 6-14689 also teaches the changing of scanning intervals which is accomplished by activating an auxiliary coil separate from a deflection coil using a horizontal frequency signal.

Figure 5:
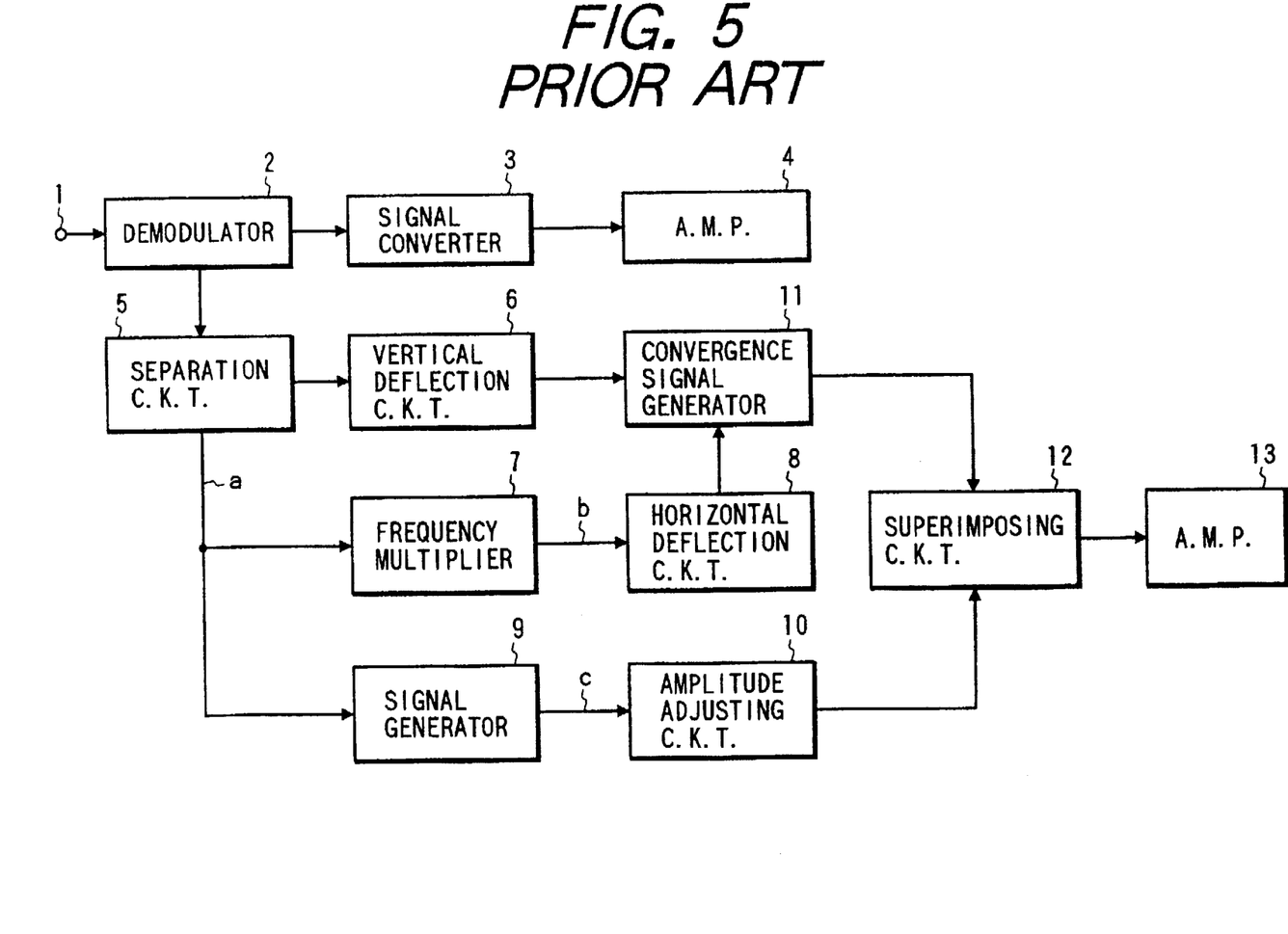
FIG. 5 is a block diagram which shows a circuit structure of a conventional television receiver.

FIG. 5 shows a television receiver taught in the above publication No. 57-65066.

The television receiver includes generally a demodulator 2, a signal converter 3, an amplifier 4, a synchronizing signal separation circuit 5, a vertical deflection circuit 6, a frequency multiplier 7, a horizontal deflection circuit 8, a signal generation circuit 9, an amplitude adjusting circuit 10, a convergence signal generation circuit 11, a superimposing circuit 12, and an amplifier 13.

A video signal (e.g., an NTSC signal) entering an input terminal 1 is transmitted to the signal converter 3 through the demodulator 2. The video signal is then converted by the signal converter 3 into a signal having a horizontal scanning frequency of twice that of the input video signal and supplied to a CRT (not shown) through the amplifier 4. The signal converter 3 includes a memory storing a demodulated signal of each horizontal cycle and reads out the stored signal twice at twice the speed at which the demodulated signal is stored to double the horizontal scanning frequency of the input video signal.

A synchronizing signal provided by the demodulator 2 is separated by the synchronizing signal separation circuit 5 into a horizontal synchronizing signal and a vertical synchronizing signal. The vertical synchronizing signal is supplied to the vertical deflection circuit 6 to operate a deflection yoke. The horizontal synchronizing signal is converted by the frequency multiplier 7 into a horizontal synchronizing signal having a doubled frequency and then supplied to the horizontal deflection circuit 8 to operate the deflection yoke. The horizontal synchronizing signal is also supplied to the signal generation circuit 9 wherein a pulse signal having a duty cycle of 50% is produced based on the horizontal synchronizing signal.

Figure 6A:
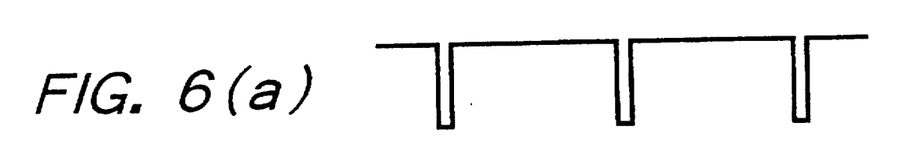
FIG. 6(a) shows the horizontal synchronizing signal of an input picture signal.
Figure 6B:
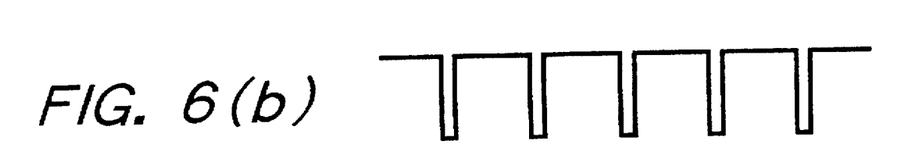
FIG. 6(b) shows a horizontal synchronizing signal whose frequency is doubled by a frequency multiplier 7.
Figure 6C:
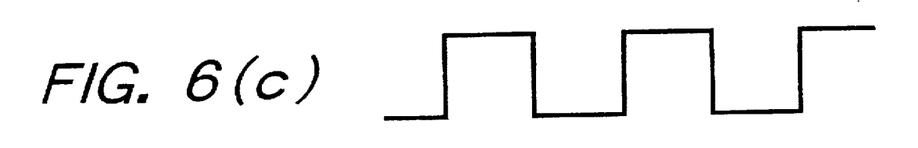
FIG. 6(c) shows a pulse signal having a duty cycle of 50% produced by a signal generation circuit 9.

FIG. 6(a) shows the horizontal synchronizing signal of the input picture signal. FIG. 6(b) shows the horizontal synchronizing signal whose frequency is doubled by the frequency multiplier 7. FIG. 6(c) shows the pulse signal having a duty cycle of 50% produced by the signal generation circuit 9.

Referring back to FIG. 5, the pulse voltage produced by the signal generation circuit 9 is adjusted in amplitude by the amplitude adjusting circuit 10 and then superimposed by the superimposing circuit 12 on a convergence signal provided by the convergence signal generation circuit 11. The pulse voltage-superimposed convergence signal activates a convergence coil (not shown) through the amplifier 13 to adjust intervals between scanning lines.

Figure 7A:
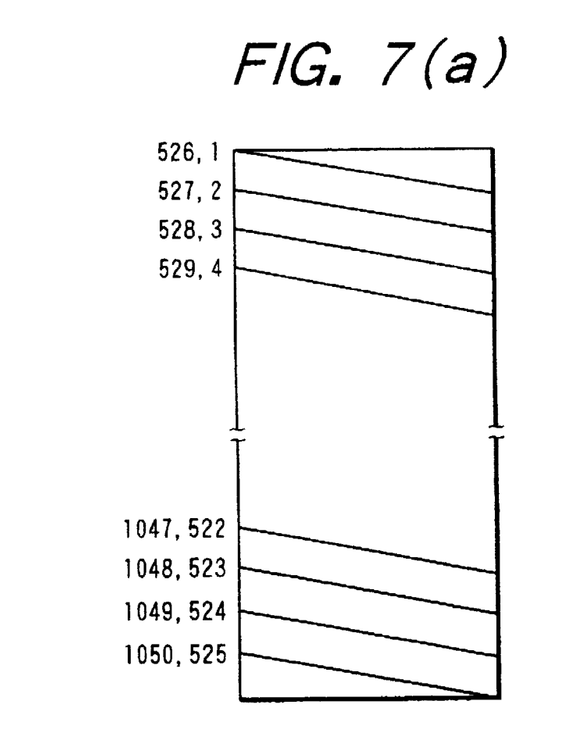
FIG. 7(a) shows a scanning pattern of a system excluding a signal generation circuit 9 and a amplitude adjusting circuit 10, as shown in FIG. 5.
Figure 7B:
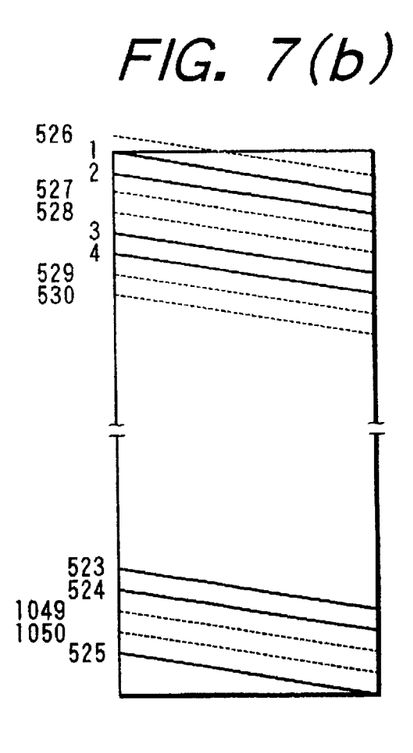
FIGS. 7(b) and 7(c) show scanning patterns of the system of FIG. 5.
Figure 7C:
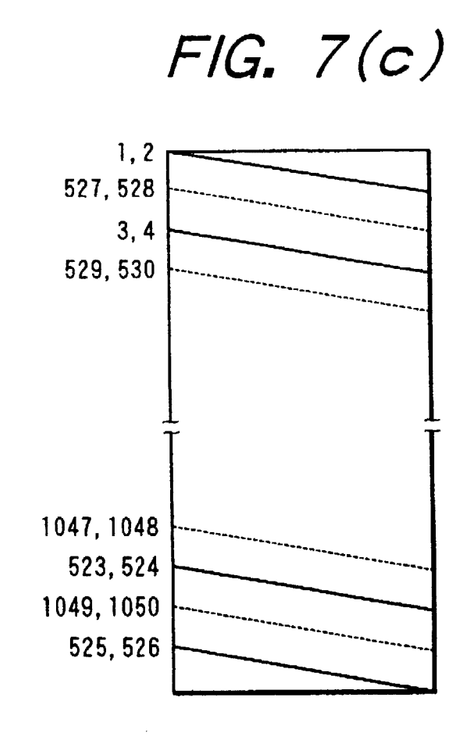

The adjustment of intervals between the scanning lines will be described with reference to FIGS. 7(a) to 7(c). FIG. 7(a) shows a scanning pattern of a system excluding the signal generation circuit 9 and the amplitude adjusting circuit 10, as shown in FIG. 5. FIGS. 7(b) and 7(c) show scanning patterns of the system of FIG. 5. Numerals in each drawing indicate the numbers of scanning lines, respectively. The scanning lines in an even field are represented by solid lines, while the scanning lines in an odd field are represented by broken lines. Note that in FIG. 7(a), since the scanning lines in the even field and the odd field coincide with each other, all the scanning lines are represented by solid lines.

The number of scanning lines in the scanning pattern shown in FIG. 7(a) is an even number (e.g., 1050 scanning lines). The scanning lines in the even and odd fields are thus overlapped with each other so that the interlace scanning and reproduction of an original signal are not achieved by the system excluding the signal generation circuit 9 and the amplitude adjusting circuit 10.

In the scanning pattern as shown in FIG. 7(b) where scanning line intervals are adjusted, 2mth (m=natural number) scanning lines are controlled to fall between 2m−1th scanning lines and original locations of the 2mth scanning lines, respectively. This is accomplished by superimposing the pulse voltage shown in FIG. 6(c), which is made by the signal generation circuit 9 from the horizontal synchronizing signal shown in FIG. 6(a), on a convergence signal. Specifically, the polarity of the pulse voltage is selected so as to provide a deflection direction opposite to a vertical scanning signal, and the magnitude of the pulse voltage is adjusted by the amplitude adjusting circuit 10 to the amplitude required for moving a scanning line one-half an scanning line interval. This allows the number of scanning lines to be doubled in the interlace scanning.

In the scanning pattern as shown in FIG. 7(c) where scanning line intervals are adjusted, 2mth scanning lines are controlled to fall exactly on 2m−1th scanning lines. The number of scanning lines, as visible in the drawing, is equivalent to the number of scanning lines of the original video signal (NTSC signal). This is accomplished by adjusting the amplitude of the pulse voltage shown in FIG. 6(c) through the signal generation circuit 9 and the amplitude adjusting circuit 10 to a value which shifts each scanning line by one scanning interval. This allows the horizontal scanning frequency to be doubled while maintaining the number of scanning lines and a scanning pattern of the original signal. Specifically, the same scanning pattern as that produced by interlace scanning of an NTSC signal before the double speed conversion is established.

As apparent from the above discussion, in the television receiver taught in Japanese Patent Second Publication No. 6-14689, the adjustment of the scanning line intervals is accomplished by controlling through the amplitude adjusting circuit 10 the amplitude of pulse voltage produced by the signal generation circuit 9.

Figure 8:
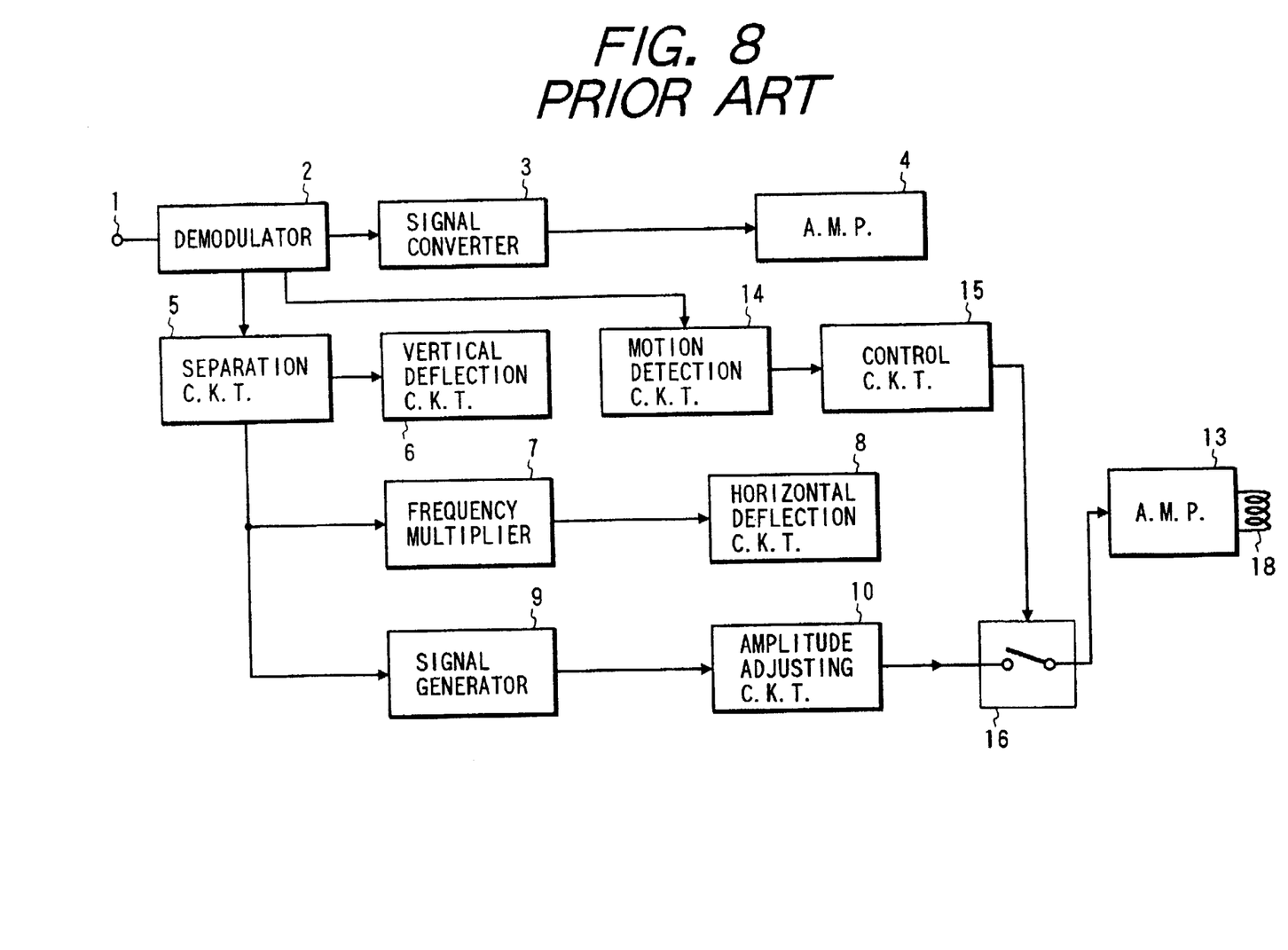
FIG. 8 is a block diagram which shows a circuit structure of another conventional television receiver.

FIG. 8 shows a television receiver taught in the above publication No. 6-14689. The same reference numbers as employed in FIG. 5 refer to the same parts, and explanation thereof in detail will be omitted here.

The television receiver of FIG. 8 determines through a motion detection circuit 14 and a control circuit 15 whether an input signal represents a still picture or not. If the input signal represents a still picture, a connecting switch 16 is turned on to activate an auxiliary coil 18 for overlapping two scanning lines to produce a single scanning line.

In the above prior art circuit structures, the resolution in the vertical direction when the NTSC signal is converted into a signal having a doubled horizontal scanning frequency (i.e., when a picture signal of each line is converted twice to produce consecutive picture signals, is improved by overlapping two of the scanning lines with each other.

When a picture signal such as a VGA (video graphics array) signal or an OSD (on-screen display) signal whose horizontal scanning frequency is twice that of an NTSC signal, high-quality pictures are recreated by scanning, as shown in FIG. 7(a), scanning lines separately without overlapping them.

However, when a picture signal such as VGA or OSD signal whose horizontal scanning frequency is usually twice that of an NTSC signal and an NTSC signal whose horizontal scanning frequency is, as described above, doubled are combined and then displayed on the same screen (e.g., PIP or two-picture display wherein two different pictures are recreated on horizontally divided half-sized areas of one image screen), the above prior art systems encounter the following drawbacks.

When two of the scanning lines are combined into a single scanning line, that is, when 2mth scanning lines are overlapped with 2m−1th scanning lines, the 2mth scanning lines are undesirably shifted from their original positions in a portion of a screen displaying a picture signal whose horizontal scanning frequency is originally twice that of an NTSC signal, and signals of the 2mth scanning lines which are different in content from those the 2m−1th scanning lines are reproduced in overlap with the signals of the 2m−1th scanning lines, thereby causing the image quality to be degraded.

Conversely, when the picture signal is reproduced using discrete scanning lines, the same reduction in image quality as discussed above arises in a portion of the screen displaying an NTSC signal whose horizontal scanning frequency is doubled.

SUMMARY OF THE INVENTION

It is therefore a principal object of the present invention to avoid the disadvantages of the prior art.

It is another object of the present invention to provide a television receiver designed to combine a first input picture signal whose horizontal scanning frequency is twice that of a second input picture signal and a third picture signal into which the first input picture signal is double-speed converted and to scan them in an improved scan format.

According to one aspect of the present invention, there is provided a television receiver which comprises (a) a signal conversion circuit which doubles a horizontal scanning frequency of a first picture signal inputted to the television receiver to produce a second picture signal including a sequence of line signals consecutive two of which are formed by the same portion of the first picture signal, (b) an auxiliary coil which scans an electron beams on an image screen along given scanning lines, (c) an auxiliary coil activating circuit which provides a control signal to the auxiliary coil to selectively activating the auxiliary coil in a first operation mode and a second operation mode, the first operation mode being such that the electron beam is scanned along the scanning lines to reproduce a third picture signal inputted to the television receiver, having a horizontal scanning frequency of substantially twice that of the first picture signal, the second operation mode being such that scanning line intervals are controlled so as to scan the electron beam two times along the same scanning line to reproduce the consecutive two of the line signals of the second picture signal, (d) a signal combining circuit which combines the third picture signal and the second picture signal to display the second and third picture signals on different areas of the image screen, the signal combining circuit providing an area signal indicating at least one of the areas of the image screen on which the second and third picture signals are displayed, and (e) a switching means, responsive to the area signal provided by the signal combining circuit, for switching between the first and second operation modes of the auxiliary coil.

According to another aspect of the present invention, there is provided a television receiver which comprise (a) a signal conversion circuit which doubles a horizontal scanning frequency of first type of picture signals inputted to the television receiver to produce second type of picture signals each including a sequence of line signals consecutive two of which are formed by the same portion of each of the first type of picture signals, (b) an auxiliary coil which scans an electron beams on an image screen along given scanning lines, (c) an auxiliary coil activating circuit which provides a control signal to the auxiliary coil to selectively activating the auxiliary coil in a first operation mode and a second operation mode, the first operation mode being such that the electron beam is scanned in sequence along the scanning lines to reproduce third type of picture signals inputted to the television receiver, having a horizontal scanning frequency of substantially twice that of the first type of picture signals, the second operation mode being such that scanning line intervals are controlled so as to scan the electron beam two times along the same scanning line to reproduce the consecutive two of the line signals of each of the second type of picture signals, (c) a signal combining circuit which combines the third type of picture signals and the second type of picture signals to display each of the second and third types of picture signals on a plurality of display areas of the image screen, the signal combining circuit providing area signals indicating at least one of the display areas of the image screen on which the second and third types of picture signals are displayed, and (d) a switching means, responsive to the area signals provided by the signal combining circuit, for switching between the first and second operation modes of the auxiliary coil.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
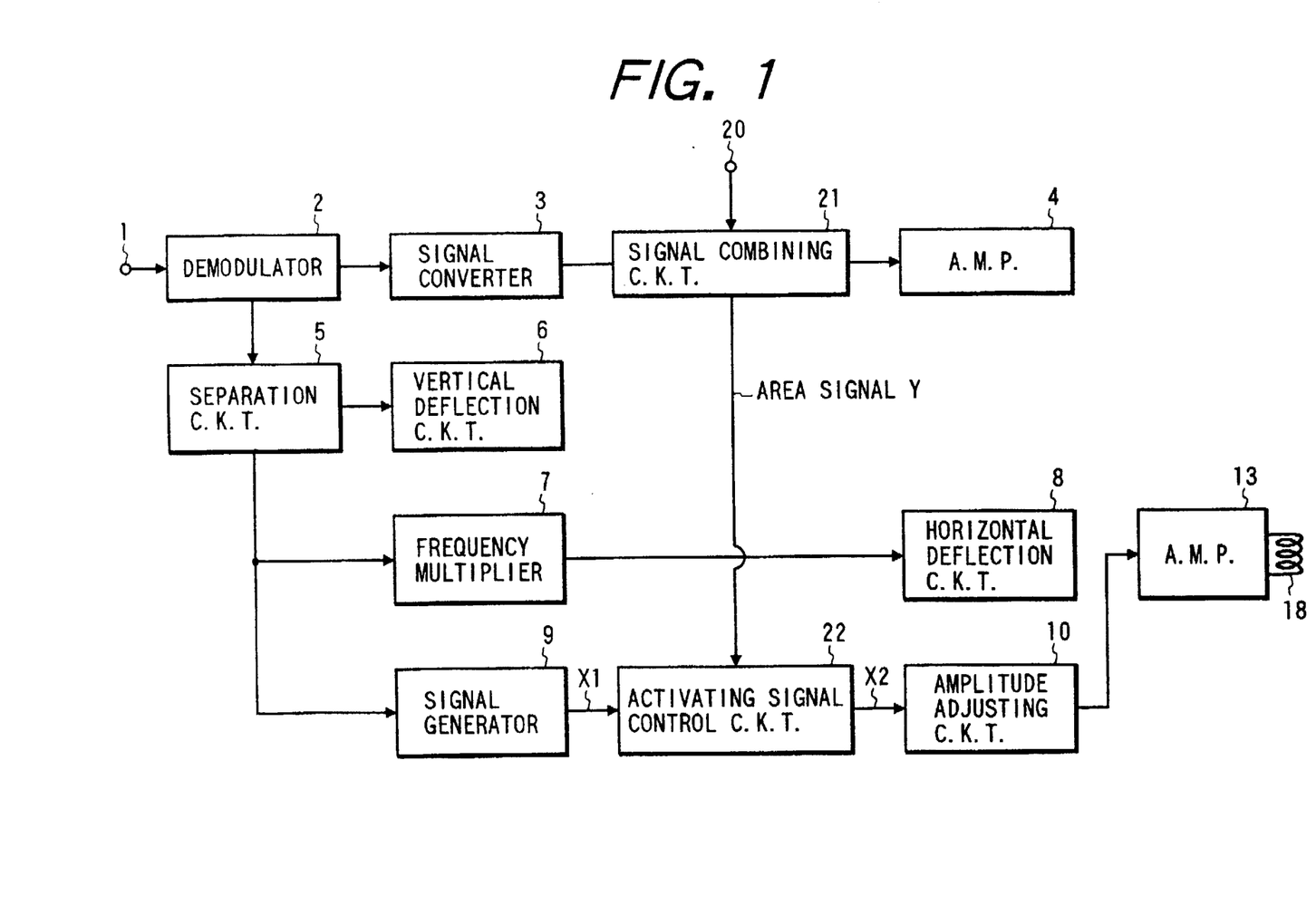
FIG. 1 is a block diagram which shows a circuit structure of a television receiver according to the present invention.

Referring now to the drawings, particularly to FIG. 1, there is shown a television receiver according to the present invention. The same reference numbers as employed in explaining the conventional television receivers in FIGS. 5 and 8 indicate the same parts, and explanation thereof in detail will be omitted here.

The television receiver of this embodiment is different from the conventional television receivers in that an activating-signal control circuit 22 is provided which combines an auxiliary coil-activating basic pulse signal X1 (i.e., a scanning line interval-adjusting signal) and an area signal Y (i.e., a signal indicative of a display area on an image screen) to produce an auxiliary coil-activating signal X2 for switching an operation mode of a scanning line interval-adjusting auxiliary coil 18. Specifically, this embodiment features the scanning line interval-adjusting auxiliary coil 18 and control thereof, and in the drawing, a convergence coil and a convergence signal generation circuit are omitted for the brevity of illustration.

A horizontal synchronizing signal (see, FIG. 6(a)), provided by the synchronizing signal separation circuit 5 is supplied to the signal generation circuit 9. The signal generation circuit 9 produces pulses each having a duty cycle of 50% (see, FIG. 6(c)).

Figures 4A, 4B, 4C:
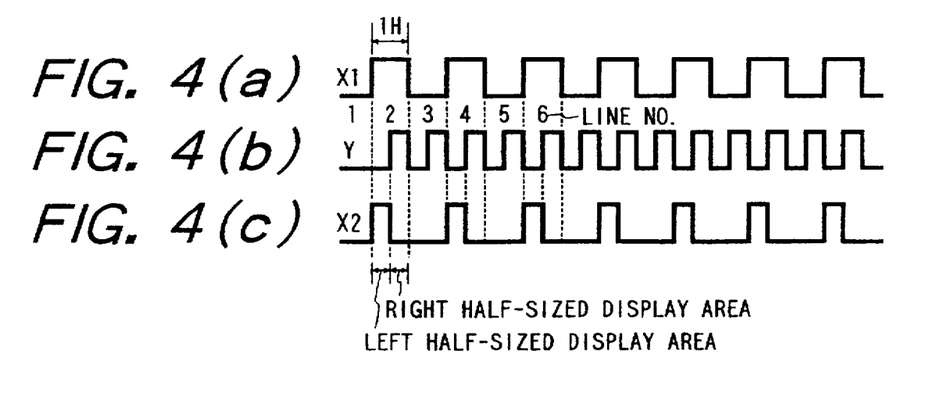
FIGS. 4(a), 4(b), and 4(c) show waveforms of an auxiliary coil-activating basic pulse signal X1, an area signal Y indicative of a display area on an image screen, and an auxiliary coil-activating signal X2, respectively.

The pulses produced by the signal generation circuit 9 serve as the auxiliary coil-activating basic pulse signal X1 shown in FIG. 4(a) (which is identical with the one shown in FIG. 6(c)). This pulse voltage is adjusted in amplitude by the amplitude adjusting circuit 10 to activate the auxiliary coil 18 through the amplifier 13 for adjusting scanning line intervals.

The signal-combining circuit 21 following the signal converter 3 combines a picture signal (e.g., a VGA signal) entering the input terminal 20, having a horizontal scanning frequency of substantially twice that of an NTSC signal with an NTSC signal which is double-speed converted by the signal converter 3 for displaying them on an image screen. The signal-combining circuit 21 has a well-known structure designed to display two picture signals simultaneously on different areas of the same image screen (e.g., PIP, POP, two-picture display, or halftone display wherein a picture signal is displayed over another picture signal so that a lower image can be seen through an upper image).

When the auxiliary coil-activating basic pulse signal X1 is inputted directly to the amplitude adjusting circuit 10, 2mth scanning lines appear, as shown in FIG. 7(c), over the entire surface of the image screen at locations where 2m−1th scanning lines are scanned. Specifically, high level portions of the basic pulse signal X1 activate the auxiliary coil 18 so that the auxiliary coil 18 scans 2mth scanning lines at the locations where 2m−1th scanning lines are scanned during the intervals in which the basic pulse X1 is at high level.

The signal generation circuit 9, the amplitude adjusting circuit 10, and the amplifier 13 constitute an auxiliary coil-activating circuit.

Figure 2:
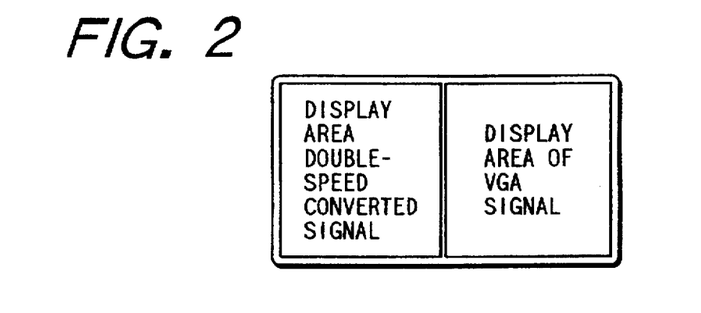
FIGS. 2 is an illustration which shows display areas defined on one image screen where a double-speed converted NTSC signal and a VGA signal are displayed.

The two-picture display wherein the double-speed converted NTSC signal is, as shown in FIG. 2, displayed on a left half-sized area of an image screen, while the VGA signal is displayed on a right half-sized area of the image screen will be discussed below.

Figure 3:
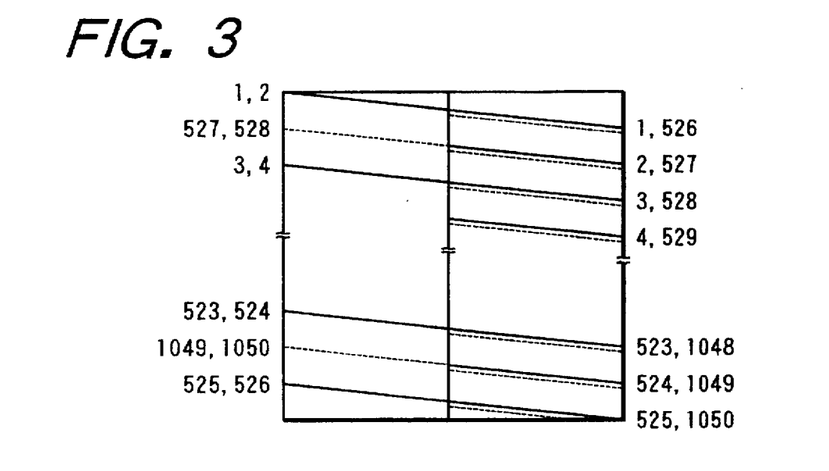
FIG. 3 is an illustration which shows scanning patterns on the display areas shown in FIG. 2.

In order to display two different picture signals on the left and right half-sized areas of the image screen simultaneously, it is necessary to scan on the left half-sized area 2mth scanning lines at locations where 2m−1th scanning lines are scanned, while on the right half-sized area, all the scanning lines are scanned independently without being overlapped with each other. In FIG. 3, solid lines indicate scanning lines in an odd field, while broken lines indicate scanning lines in an even field. The broken lines are illustrated as being slightly separate from the solid lines on the right half-sized area, but in fact, they coincide with each other.

The high level portions of the auxiliary coil-activating basic pulse signal X1, as described above, serve to scan 2mth scanning lines at the same locations as those of 2m−1th scanning lines. Thus, scanning shown in FIG. 3 is achieved by changing the high level portions of the auxiliary coil-activating basic pulse signal X1 to low levels when the 2mth scanning lines are scanned on the right half-sized area.

The area signal Y shown in FIG. 4(b) is a signal outputted from the signal-combining circuit 20 which indicates a display area of the image screen where the VGA signal is displayed. Specifically, high level portions of the area signal Y indicate a VGA signal-displaying area, that is, the right half-sized area of the image screen. Therefore, an auxiliary coil-activating pulse signal X2, as shown in FIG. 4(c), is derived by combining the auxiliary coil-activating pulse signal X1 and the area signal Y to change in level portions of the auxiliary coil-activating pulse signal X1 corresponding to the right half-sized area of the image screen. The auxiliary coil-activating pulse signal X2 is produced by the activating signal control circuit 22 disposed between the signal generation circuit 9 and the amplitude adjusting circuit 10.

The auxiliary coil-activating pulse signal X2 is outputted to the amplifier 13 through the amplitude adjusting circuit 10 to control the auxiliary coil 18 to achieve the scanning patterns, as shown in FIG. 3, which are different between the right and left half-sized areas of the image screen.

In the above embodiment, the activating signal control circuit 22 is arranged between the signal generation circuit 9 and the amplitude adjusting circuit 10, but it may alternatively be disposed following the amplitude adjusting circuit 10.

In the embodiment as discussed above, the area signal Y in a horizontal direction is used since the image screen is horizontally divided, but an area signal in a vertical direction outputted from the signal-combining circuit 21 is used if the image screen is vertically divided. In addition, multi-screen division into four display areas may be accomplished by modifying the auxiliary coil-activating pulse signal using both the horizontal area signal Y and the vertical area signal.

Further, the overlap of a picture provided by an OSD signal with a portion of an area where the double-speed converted NTSC signal is reproduced (for example, halftone display where the double-speed converted NTSC signal is added to the OSD signal so that a picture provided by the NTSC signal can be seen through a picture provided by the OSD signal) is achieved by scanning the scanning lines independently in an OSD signal-displaying area based on an area signal indicative of the OSD signal-displaying area while overlapping consecutive two of scanning lines in an area other than the OSD signal-displaying area. In the halftone display, scanning lines of the NTSC signal, like the OSD signal, appear independently within the OSD signal-displaying area.

Conversely, the overlap of a picture provided by the double-speed converted NTSC signal with a portion of the OSD signal-displaying area is achieved by overlapping of two consecutive scanning lines only in an NTSC signal-displaying area based on an area signal indicative of the NTSC signal-displaying area. For example, this is achieved by using a switching circuit which switches an operation mode of the auxiliary coil 18 to scan an electron beam only provided by the double-speed converted signal two times along the same scanning line, in sequence, based on an area signal indicating a display area of at least one of two picture signals to be combined.

The use of a convergence coil as the auxiliary coil 18 requires superimposing an auxiliary coil-activating signal (i.e., a scanning line interval-adjusting signal) outputted from the amplitude adjusting circuit 10 on a convergence signal in a conventional manner to supply it to the convergence coil.

While an NTSC signal is, as discussed above, converted into a picture signal whose horizontal scanning frequency is twice that of the NTSC signal, this means that the horizontal scanning frequency of the NTSC signal is changed to a value within an allowable operation range of a typical television receiver.

The above embodiment is directed to the two-picture display, but the present invention is not limited to the same. For example, multi-picture display such as six-picture display wherein double-speed converted NTSC signals are reproduced in first, third, and fifth display areas, while VGA signals are reproduced in second, fourth, and sixth display areas, may also be accomplished by scanning of two scanning lines only of each NTSC signal so as to overlap each other.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A television receiver comprising:

a signal conversion circuit which doubles a horizontal scanning frequency of a first picture signal inputted to the television receiver to produce a second picture signal including a sequence of line signals of which two consecutive line signals are formed by the same portion of the first picture signal;

an auxiliary coil which scans an electron beam on an image screen along given scanning lines;

an auxiliary coil activating circuit which provides a control signal to said auxiliary coil to selectively activate said auxiliary coil in a first operation mode and a second operation mode, the first operation mode being such that the electron beam is scanned in sequence along the scanning lines to reproduce a third picture signal inputted to the television receiver, having a horizontal scanning frequency of substantially twice that of the first picture signal, the second operation mode being such that scanning line intervals are controlled so as to scan the electron beam two times along the same scanning line to reproduce the two consecutive line signals of the second picture signal;

a signal combining circuit which combines the third picture signal and the second picture signal to display the second and third picture signals on different areas of the image screen substantially simultaneously, said signal combining circuit providing an area signal indicating at least one of the areas of the image screen on which the second and third picture signals are displayed; and control means, responsive to the area signal provided by said signal combining circuit, for switching between the first and second operation modes of said auxiliary coil.

2. A television receiver comprising:

a signal conversion circuit which doubles a horizontal scanning frequency of a first type of picture signals inputted to the television receiver to produce a second type of picture signals each including a sequence of line signals two consecutive line signals are formed by the same portion of each the first type of picture signals;

an auxiliary coil which scans an electron beam on an image screen along given scanning lines;

an auxiliary coil activating circuit which provides a control signal to said auxiliary coil to selectively activate said auxiliary coil in a first operation mode and a second operation mode, the first operation mode being such that the electron beam is scanned in sequence along the scanning lines to reproduce a third type of picture signals inputted to the television receiver, having a horizontal scanning frequency of substantially twice that of the first type of picture signals, the second operation mode being such that scanning line intervals are controlled so as to scan the electron beam two times along the same scanning line to reproduce the two consecutive line signals of each of the second type of picture signals;

a signal combining circuit which combines the third type of picture signals and the second type of picture signals to display each of the second and third types of picture signals on a plurality of display areas of the image screen substantially simultaneously, said signal combining circuit providing area signals indicating at least one of the display areas of the image screen on which the second and third types of picture signals are displayed; and control means, responsive to the area signals provided by said signal combining circuit, for switching between the first and second operation modes of said auxiliary coil.

* * * * *

UNITED STATES PATENT AND TRADEMARK OFFICE
CERTIFICATE OF CORRECTION

PATENT NO.   : 5,894,332
DATED        : April 13, 1999
INVENTOR(S)  : Nobuyoshi Yamagishi It is certified that error appears in the above-indentified patent and that said Letters Patent is hereby corrected as shown below:

On the title page, item [73]:
Change "Victory" to --Victor--.

Signed and Sealed this

Twenty-eighth Day of September, 1999

Attest:

Q. TODD DICKINSON

*Attesting Officer*     *Acting Commissioner of Patents and Trademarks*